April 29, 1958    H. McK. STEELE    2,832,248
TOOL HOLDER ASSEMBLY
Filed Aug. 9, 1952    2 Sheets-Sheet 1
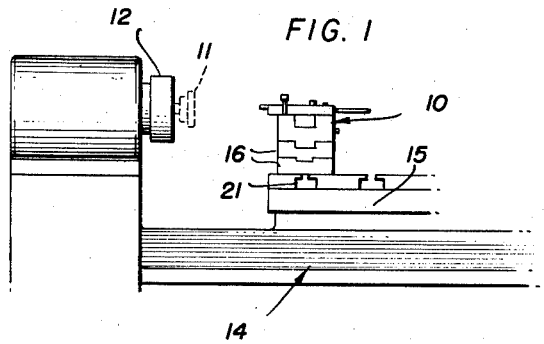
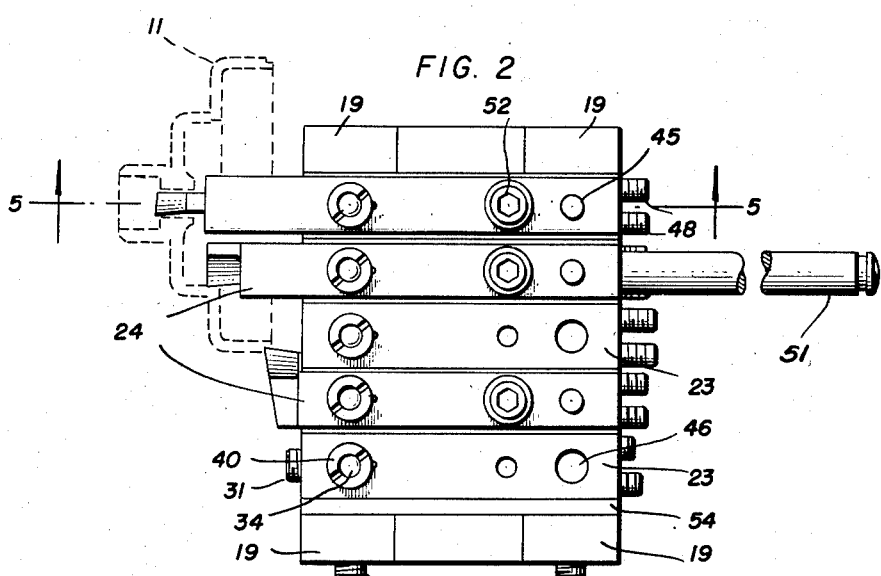
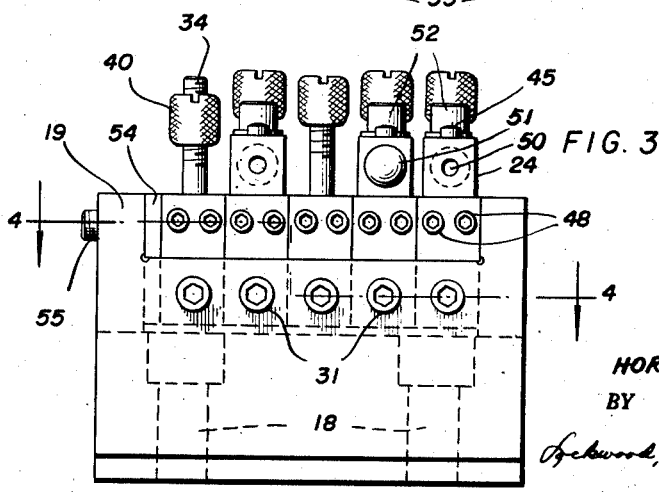
INVENTOR.
HORACE McKAY STEELE.
BY
ATTORNEYS April 29, 1958
H. McK. STEELE
2,832,248
TOOL HOLDER ASSEMBLY
Filed Aug. 9, 1952
2 Sheets-Sheet 2
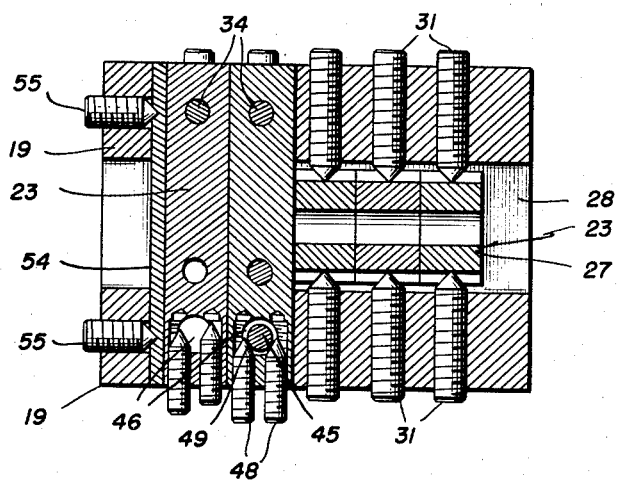
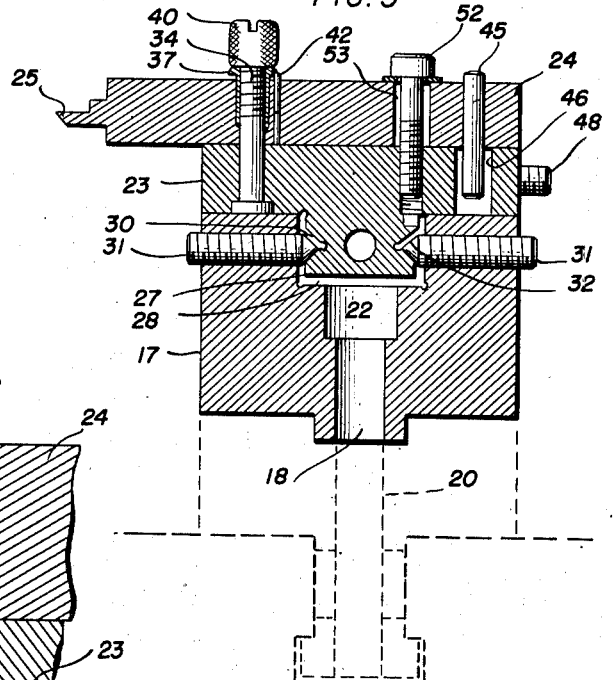
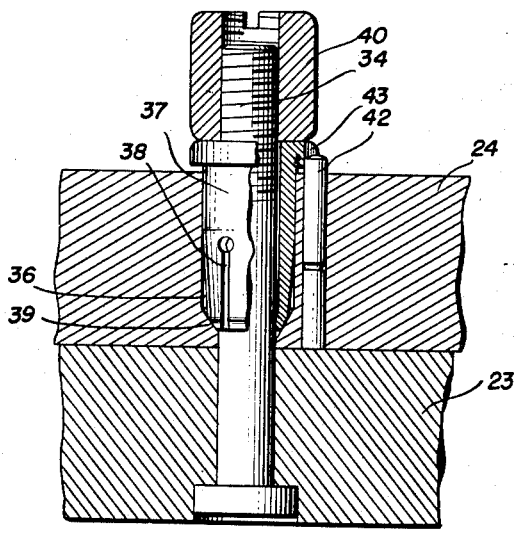
INVENTOR.
HORACE McKAY STEELE.
BY
ATTORNEYS United States Patent Office 2,832,248
Patented Apr. 29, 1958

2,832,248
TOOL HOLDER ASSEMBLY

Horace McKay Steele, Huntington, Ind., assignor to Model Engineering & Manufacturing, Inc., Huntington, Ind., a corporation Application August 9, 1952, Serial No. 303,482

5 Claims. (Cl. 82—36)

This invention relates generally to metal working tools and more particularly to a multiple tool holder assembly adapted to perform a plurality of simultaneous machining operations.

In the art of metal working it is conventional practice to form a plurality of concentric bores, diameters or surfaces by applying to the work piece a single tool in a series of sequential operations, or by applying a plurality of different tools in a series of sequential operations. These methods are satisfactory where it is only necessary to provide conventional commercial tolerances. However, these methods are not sufficiently accurate or precise when it is desired to manufacture apparatus such as precise measuring instruments. It is almost impossible to form absolutely concentric bores, diameters or surfaces where it is necessary to change tools and/or to change the adjustment of the tools. In the manufacture of precision instruments tolerances must be held to much closer values and consequently conventional machining operations become excessively expensive and time consuming. Therefore, it would be desirable to utilize apparatus having a plurality of tools arranged for simultaneous adjustment and simultaneous operation, whereby it would be possible to cut a plurality of concentric bores, diameters or surfaces with an absolute assurance that they would be concentric with one another, or parallel with one another, or in 90° relationship to one another.

The principal object of this invention is to provide apparatus comprising a plurality of preadjusted tool bits for automatically and simultaneously cutting a plurality of concentric bores, diameters or surfaces.

Another object of this invention is to provide a tool supporting block adapted adjustably to support a plurality of tool bits.

Still another object of this invention is to provide an operatively associated tool block and group of tool bits, each of which includes means for providing adjustment of each tool bit.

In accordance with the invention there is provided metal working apparatus comprising a tool block, a plurality of tool bit holders adjustably mounted on the tool block and a plurality of tool bits mounted on the holders in adjustable relation thereto.

The full nature of the invention will be understood from the accompanying drawings and the following description and claims:

Fig. 1 is a front view of the tool bit assembly, provided in accordance with this invention, mounted in operative relationship to an engine lathe.

Fig. 2 is a top plan view of the multiple tool assembly and block.

Fig. 3 is a side elevation of the apparatus shown in Fig. 2.

Fig. 4 is a cross section taken on line 4—4 of Fig. 3.

Fig. 5 is a cross section taken on line 5—5 of Fig. 2.

Fig. 6 is an enlarged detail taken from Fig. 5.

Referring to Fig. 1 of the drawings, there is provided a multiple tool holder assembly 10 adapted to perform a multiple metal cutting operation on a work piece 11 mounted in a chuck 12 of a conventional lathe 14. Tool holder assembly 10 may be mounted on a conventional tool slide 15, the height adjustment being partially determined by a plurality of spacer blocks 16 in accordance with well known practice.

Tool holder assembly 10 consists of a main supporting block 17 having at each end thereof a bore 18 for receiving a clamping bolt 20, the head of which is adapted to be slidably mounted within the T-slot 21 of the tool slide 15, and the nut of which is adapted to be received by the counterbore 22 in block 17. Thus the bolts 20 at each end of the block are adapted to fixedly mount the tool holder assembly 10 and the spacing blocks 16 on the slide 15.

The multiple tool holder assembly 10 further comprises a plurality of tool bit holders 23 which are adapted adjustably to support the tool bits 24, the cutting ends 25 of which may be formed by grinding for performing the particular cutting operation required by the particular work piece. The tool bit holders 23 each comprise a base or key portion 27 which is adapted to project into a groove 28 of block 17. On opposite sides of the base portion 27 there are formed the grooves 30 which are substantially V-shaped and extend transversely of holder 23. The walls of the grooves 30, and particularly the lower walls, cooperate with oppositely disposed set screws 31 which are threaded into the upper side portions of block 17. The set screws 31 are provided with beveled ends 32 and are located in block 17 below the centers of the grooves 30 whereby the beveled ends 32 always engage the lower walls of grooves 30. By screwing the set screws 31 into engagement with the lower walls of groove 30, the tool bit holders 23 may be clamped downwardly onto the upper surfaces of block 17, and each tool bit holder 23 may be adjustably positioned laterally of block 17 due to the fact that base portion 27 is narrower than the groove 28 whereby the tool bit holder 23 may be moved laterally of block 17 by loosening one of the screws 31 and tightening the other. It should also be noted as illustrated in Fig. 4, that the grooves 30 extend completely across the base portion 27 whereby the tool bit holder may be positioned at any desired point longitudinally of the block 17 and still be clamped thereto.

Each of the tool bit holders 23 is provided with a tool bit pivot bolt 34 which is mounted in absolutely fixed relation to the holder 23 so that each bolt 34 will be immovable with respect to its particular tool bit holder. Each tool bit 24 is provided with a bore 36 (Fig. 6) which is adapted to receive a shim 37 the ends of which include a plurality of angularly displaced slots 38 whereby the lower end of each shim is collapsible to a certain degree. The lower end of each bore 36 is beveled as at 39 whereby there is provided a cam surface adapted to collapse the lower end of each shim 37, thereby to force the shim into positive engagement with the bolt 34 for centering the tool bit with respect to bolt 34 and the associated tool bit holder. Thus when the nut 40 is screwed on to bolt 34 into engagement with the upper end of shim 37, tool bit 24 must necessarily be centered on bolt 34.

In order to insure further that there will be precise centering of each tool bit on its respective bolt 34, there is provided a pin 42 within each tool bit 24 which is adapted to engage a notch 43 in the shim 37, the purpose of this structure being to insure that the shim 37 will always assume the same angular position with respect to the bore 36. Thus in case the shim 37 may be slightly elliptical, it will always be assembled in the same relative position to bolt 34 and tool bit 24, and the tool bit 24 will always be centered in the same position relative to bolt 34.

For providing a pivotal adjustment of tool bit 24 about the bolt 34 as a center, each tool bit is provided with a dowel 45 fixed immovably within the end of bit 24 opposite to the cutting end thereof. The dowel 45 rests within an enlarged bore 46 in the associated tool bit holder 23 whereby the lower end of dowel 45 may be moved within bore 46. For controlling this movement and fixing the position of dowel 45 within bore 46, there is provided in each tool bit holder 23 a pair of set screws 48 (Fig. 4) each of which has a beveled end 49 adapted to enter bore 46 to one side of the center thereof and to one side of the lower end of the dowel 45 whereby each dowel 45 may be engaged on opposite sides thereof by the beveled ends 49 of screws 48. By screwing one screw 48 inwardly and the other outwardly with respect to dowel 45, its position may be accurately determined, and the tool bit 24 may be pivoted about the bolt 34 to provide a micrometer adjustment of the cutting end 25 with respect to the diameter which it is cutting. Thus a very precise adjustment of each tool bit is obtainable.

For facilitating the micrometer adjustment of each tool bit 24, each of them may be bored and tapped as at 50 (Fig. 3) for receiving the threaded end of a setup rod 51 (Fig. 2) which extends backwardly from the tool bit a distance sufficient to amplify the pivotal movement of the tool bit. Such a rod may have a length of seven or eight inches whereby the radial movement of its outer end may be measured and corrected by a suitable established correction factor to give the actual degree of movement of the cutting end 25. Once the individual tool bit has been finally adjusted, it may be clamped in position by means of a clamping bolt 52 which extends through an enlarged bore 53 in the tool bit into a tapped hole within the tool bit holder 23.

In using the multiple tool holder assembly the number of tool bits to be mounted thereon will be determined by the nature of the cutting operation which is to be performed. For example, the work piece 11 illustrated in Figs. 1 and 2 may be bored and turned by means of the three bits 24. Some other type of work piece might require four or five tool bits or perhaps only two of them. In any event, they may be selectively mounted on the tool bit holders as illustrated in the drawings.

Having determined the number of tool bits which may be required and the spacing thereof, the tool bits and their holders may be mounted on the block 17 between the end posts 19, and a spacer 54 may be inserted between the posts 19 and the outer tool bit holder. Screws 55 may then be tightened to clamp the tool bit holders firmly in contact with one another. The screws 31 may then be moved into engagement with each of the tool bit holders for clamping them downwardly into positive engagement with the block 17. While the tool bits may be ground in such fashion as to provide the proper cutting radii and the tool bit holders may be mounted in approximately the proper spacing with respect to one another, the final adjustment of the cutting radii may be made by means of the set screws 48 which pivot the tool holders about the posts 34. It should be noted that the tool bits are formed to be narrower than the tool bit holders 23 whereby there is adequate spacing between adjacent tool bits to allow for micrometer adjustment about the posts 34 as pivots.

From the foregoing description, it will be apparent that there is provided in accordance with this invention a multiple tool holder assembly having facilities for mounting with precision a plurality of tool bits in predetermined and precise spacing with respect to one another whereby a plurality of surfaces may be cut on a work piece in a single and simultaneous operation. This eliminates the need for cutting each surface in a separate operation and also eliminates the need for changing tools or changing the adjustment of a single tool. If this were necessary, there would be great difficulty in forming the respective surfaces in accurate relationship to one another. This difficulty is eliminated by this invention due to the fact that a series of tool bits may be preadjusted with respect to one another and no adjustment or substitution of tools is necessary for cutting a plurality of different surfaces.

The invention claimed is:

1. A metal working apparatus comprising a tool block formed to provide a longitudinal slot in the upper side thereof, a tool bit holder including a portion extending into said slot and having grooves on opposite sides thereof, set-screws in said slot off-center with respect to said grooves for engaging the walls thereof to clamp said holder to said block, a tool bit pivot bolt fixed to said holder, a tool bit mounted at one end on said bolt and including at the other end a dowel projecting downwardly thereof, said holder including an oversize bore for receiving said dowel, and camming means in said holder projecting into said bore for engaging said dowel and camming it thereby to pivot said tool bit on said pivot bolt.

2. A metal working apparatus comprising a tool block formed to provide a longitudinal slot in the upper side thereof, a tool bit holder including a portion extending into said slot and having grooves on opposite sides thereof, set-screws in said slot off-center with respect to said grooves for engaging the walls thereof to clamp said holder to said block, a tool bit pivot bolt fixed to said holder, a tool bit mounted at one end on said bolt and including at the other end a dowel projecting downwardly thereof, said holder including an oversize bore for receiving said dowel, and a pair of off-center set screws threaded into said holder to project into said bore for engaging said dowel and camming it thereby to pivot said tool bit on said pivot bolt.

3. A metal working apparatus comprising a tool block formed to provide a longitudinal slot in the upper side thereof, a T-shaped tool bit holder including a portion extending into said slot and having V-shaped grooves on opposite sides thereof, set-screws in said slot off-center with respect to said grooves for engaging the walls thereof to clamp said holder to said block, a tool bit pivot bolt fixed to said holder, a tool bit mounted at one end on said bolt and including at the other end a dowel projecting downwardly thereof, said holder including an oversize bore for receiving said dowel, a pair of off-center set screws threaded into said holder to project into said bore for engaging said dowel and camming it thereby to pivot said tool bit on said pivot bolt, and a clamping bolt extending through said tool bit into said holder for fixing said tool bit in its adjusted position.

4. A multiple tool holder comprising a block formed to provide corner posts and a longitudinal groove, a plurality of tool holders including key portions movably mounted in said groove between said corner posts, each key portion including transverse grooves, clamping means disposed in said block to engage said grooves for clamping said holders downwardly on to said block, and clamping means in one pair of corner posts for engaging said holders longitudinally of said block.

5. A multiple tool holder comprising a block formed to provide corner posts and a longitudinal groove, a plurality of tool holders mounted in said groove between said corner posts, each tool holder including a portion projecting into said longitudinal groove, said projecting portion including V-shaped transverse grooves, set screws disposed in said block in off-center relationship to said V- shaped grooves for clamping said holders downwardly on to said block, and set screws in one pair of corner posts for clamping said holders longitudinally of said block.

References Cited in the file of this patent

UNITED STATES PATENTS

| | | |
|---|---|---|
| 375,489 | Hunt | Dec. 27, 1887 |
| 426,311 | Parker | Apr. 22, 1890 |
| 463,521 | Lee | Nov. 17, 1891 |
| 1,222,178 | Browand | Apr. 10, 1919 |
| 1,326,598 | Jaques | Dec. 30, 1919 |
| 1,493,051 | O'Brien | May 6, 1924 |
| 1,526,849 | Grabill | Feb. 17, 1925 |
| 2,282,919 | Zempel | May 12, 1942 |
| 2,363,160 | Sundstrom | Nov. 21, 1944 |
| 2,369,014 | Bruns | Feb. 6, 1945 |
| 2,374,528 | Emde et al. | Apr. 24, 1945 |
| 2,634,646 | Clatfelter | Apr. 14, 1953 |

FOREIGN PATENTS

| | | |
|---|---|---|
| 84,483 | Switzerland | Mar. 16, 1920 |
| 290,086 | Great Britain | May 10, 1928 |

OTHER REFERENCES

American Machinist (Publication), Two Unusual Jig and Fixture Bushings, page 720, vol. 45, No. 17, Oct. 26, 1916.